United States Patent
Suzuki (10) Patent No.: US 7,819,533 B2
(45) Date of Patent: Oct. 26, 2010

(54) LIGHT SOURCE UNIT AND PROJECTOR APPARATUS

(75) Inventor: Yukio Suzuki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1279 days.

(21) Appl. No.: 11/360,889

(22) Filed: Feb. 23, 2006

(65) Prior Publication Data
US 2006/0197925 A1    Sep. 7, 2006

(30) Foreign Application Priority Data
Mar. 7, 2005    (JP)    ............... 2005-062627

(51) Int. Cl.
*G03B 21/28*    (2006.01)
*F21V 33/00*    (2006.01)
(52) U.S. Cl. .................. 353/102; 353/99; 362/347; 362/296.01
(58) Field of Classification Search .......... 353/98, 353/102, 99; 349/5, 7, 8, 9, 67; 362/297, 362/298, 346, 296.01, 299, 302, 341, 347, 362/348
See application file for complete search history.

(56) References Cited

U.S. PATENT DOCUMENTS

| | | | |
|---|---|---|---|
| 1,064,010 A | | 6/1913 | Roebuck |
| 1,085,795 A | | 2/1914 | Boyle |
| 3,732,417 A | * | 5/1973 | Nordquist ............... 362/309 |
| 4,355,350 A | | 10/1982 | Mader et al. |
| 4,642,740 A | | 2/1987 | True |
| 5,790,305 A | * | 8/1998 | Marcellin-Dibon et al. . 359/364 |
| 6,575,598 B2 | * | 6/2003 | Weigert et al. ............ 362/268 |
| 6,997,565 B2 | * | 2/2006 | Sekiguchi et al. .......... 353/102 |
| 7,068,446 B2 | * | 6/2006 | Jacobson et al. ........... 359/726 |

(Continued)

FOREIGN PATENT DOCUMENTS

EP    0 198 676 A2    10/1986

(Continued)

OTHER PUBLICATIONS

Chinese Office Action dated Nov. 28, 2008 and English translation thereof issued in a counterpart Chinese Application.

(Continued)

*Primary Examiner*—William C Dowling
(74) *Attorney, Agent, or Firm*—Holtz, Holtz, Goodman & Chick, PC (57) ABSTRACT

A light source unit and a projector apparatus secure a certain light quantity by improving the utilization efficiency of light, and thereby realize miniaturization. The light source unit includes a reflector having an opening for housing a lamp and an opening for radiating light, the reflector having an inner surface subjected to mirror surface working to be shaped in a polynomial surface, a light source equipped with a bulb and an electrode introducing unit guiding an electrode to the bulb, the bulb being inserted into the reflector from the opening and being disposed so that a focus position of the light reflected by an inner wall of the reflector is not located on the electrode introducing unit, and a condenser lens condensing the light emitted from the reflector, the condenser lens disposed so as to be located on an optical axis of light emitted from the light source.

6 Claims, 6 Drawing Sheets

U.S. PATENT DOCUMENTS

| | | | |
|---|---|---|---|
| 7,075,713 B2 * | 7/2006 | Arenberg | 359/359 |
| 7,178,922 B2 * | 2/2007 | Sekiguchi et al. | 353/102 |
| 7,195,388 B2 | 3/2007 | Hori | |
| 7,490,956 B2 * | 2/2009 | Hough | 362/247 |
| 2002/0114160 A1 | 8/2002 | Weigert et al. | |
| 2004/0070735 A1 | 4/2004 | Sekiguchi et al. | |
| 2004/0246451 A1 | 12/2004 | Fujisawa et al. | |
| 2005/0078302 A1 | 4/2005 | Bergendahl et al. | |
| 2006/0126341 A1 * | 6/2006 | Suzuki | 362/307 |
| 2006/0171150 A1 | 8/2006 | Shimaoka | |
| 2007/0115664 A1 | 5/2007 | Suzuki | |

FOREIGN PATENT DOCUMENTS

| | | |
|---|---|---|
| JP | 61-100712 A | 5/1986 |
| JP | 61-275701 A | 12/1986 |
| JP | 4-104241 A | 4/1992 |
| JP | 6-51401 A | 2/1994 |
| JP | 7-174974 A | 7/1995 |
| JP | 10-288757 A | 10/1998 |
| JP | 2002-298625 A | 10/2002 |
| JP | 2002-350778 A | 12/2002 |
| WO | WO2005/008329 A1 | 1/2005 |

OTHER PUBLICATIONS

Korean Office Action (and English language translation thereof) dated Mar. 12, 2008, issued in a counterpart Korean Application.

Office Action dated Feb. 18, 2009, issued in related U.S. Appl. No. 11/293,476 (14 pages).

Notification Concerning Transmittal of International Preliminary Report on Patentability, Chapter I of the Patent Cooperation Treaty and Written Opinion of the International Searching Authority, dated Sep. 20, 2007, for PCT/JP2006/303536 7 sheets.

Japanese Office Action dated Apr. 30, 2008 and English translation thereof, issued in a counterpart application No. 2005-062627.

* cited by examiner

LIGHT SOURCE UNIT AND PROJECTOR APPARATUS

BACKGROUND OF THE INVENTION

1. Field of the Invention

The present invention generally relates to a light source unit and a projector apparatus equipped with the light source unit, and more particularly to a light source unit miniaturized without decreasing the utilization efficiency of light from a light source and a projector apparatus equipped with the light source unit.

2. Description of the Related Art

A projector apparatus is configured to display an image on a screen by making the light that has outgone from a light source unit be incident into a mirror tunnel to make the light having a uniform intensity distribution after making the light pass through a color wheel, and by projecting the light with the light quantity being switched at each pixel with a micromirror device, a liquid crystal display device or the like.

Figure 9:
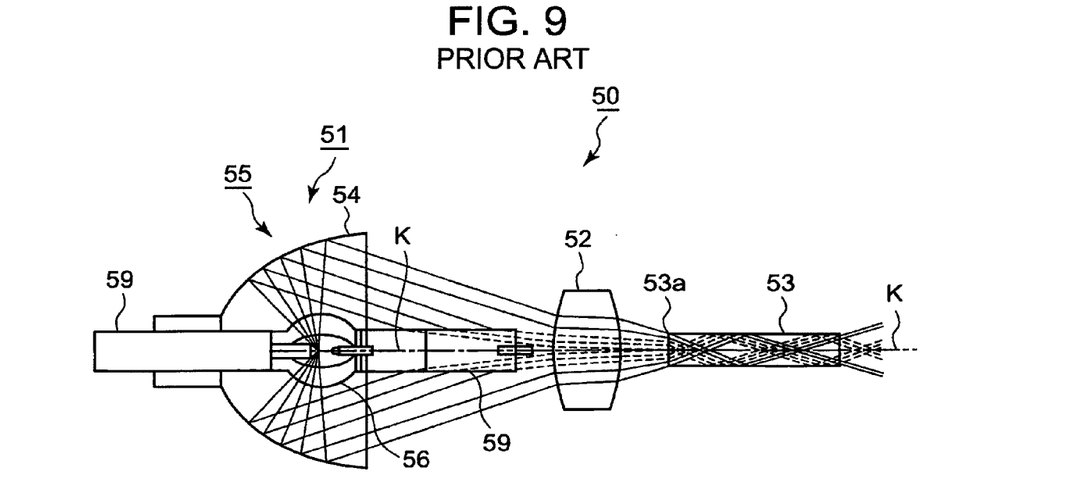
FIG. 9 is a sectional view of a conventional light source unit.

As shown in FIG. 9, a light source unit 50 is composed of a light source 51 radiating light, a convex lens 52, which is disposed on an optical axis K for condensing the light emitted form the light source 51, and a mirror tunnel 53, into which the light that has outgone from the convex lens 52 is made to be incident (see JP Hei 06-51401A).

The light source 51 is composed of a reflector 54 and a lamp 55 inserted into the reflector 54. The lamp 55 is composed of a bulb 56 and electrode introducing units 59, and the lamp 55 is inserted so that the bulb 56 may be located in the reflector 54. In addition, the color wheel is omitted in FIG. 9.

Here, a part of the light that has been emitted from the bulb 56 and has been reflected by the inner wall of the reflector 54 strikes the electrode introducing unit 59, and the light quantity of the light is attenuated. Moreover, the convex lens 52 cannot sufficiently radiate the light reflected by the reflector 54 onto the incidence plane 53a of the mirror tunnel 53.

Accordingly, in order to secure a certain light quantity, it becomes necessary for the light source unit 50 to have a size equal to a certain size or more, and a projector apparatus having the light source unit 50 built therein has a tendency to become large in size. Consequently, the projector apparatus is not always easy to carry and to install.

Although the size of a light source unit is more preferable to be smaller from the viewpoint of miniaturizing the whole body, it has been necessary for the size of the lamp of the light source unit to be a certain size or more from the viewpoint of securing a light quantity.

SUMMARY OF THE INVENTION

A preferable aspect of the present invention is a light source unit including: a reflector having an opening for housing a lamp and an opening for radiating light, the reflector having an inner surface subjected to mirror surface working to be shaped in a polynomial surface; a light source equipped with a bulb emitting light and an electrode introducing unit guiding an electrode to the bulb, the bulb being inserted into the reflector from the opening for housing the lamp and being disposed so that a focus position of the light emitted from the bulb and reflected by an inner wall of the reflector is not located on the electrode introducing unit; and a condenser lens condensing the light emitted from the reflector, the condenser lens disposed so as to be located on an optical axis of light emitted from the light source.

Moreover, another preferable aspect of the present invention is a projector apparatus including: a light source unit composed of a reflector having an opening for housing a lamp and an opening for radiating light, the reflector having an inner surface subjected to mirror surface working to be shaped in a polynomial surface, a light source equipped with a bulb emitting light and an electrode introducing unit guiding an electrode to the bulb, the bulb being inserted into the reflector from the opening for housing the lamp and being disposed so that a focus position of the light emitted from the bulb and reflected by an inner wall of the reflector is not located on the electrode introducing unit, and a condenser lens condensing the light emitted from the reflector, the condenser lens disposed so as to be located on an optical axis of light emitted from the light source; a mirror tunnel guiding light that has outgone from the condenser lens; a lens condensing light that has outgone from the mirror tunnel; a micro-mirror device receiving light that has outgone from the lens to project an image; and a projector lens expanding the image projected from the micro-mirror device.

DESCRIPTION OF THE PREFERRED EMBODIMENTS

Next, an embodiment of the present invention is described by reference to the drawings. However, the range of the invention is not limited to the shown example.

Figure 1:
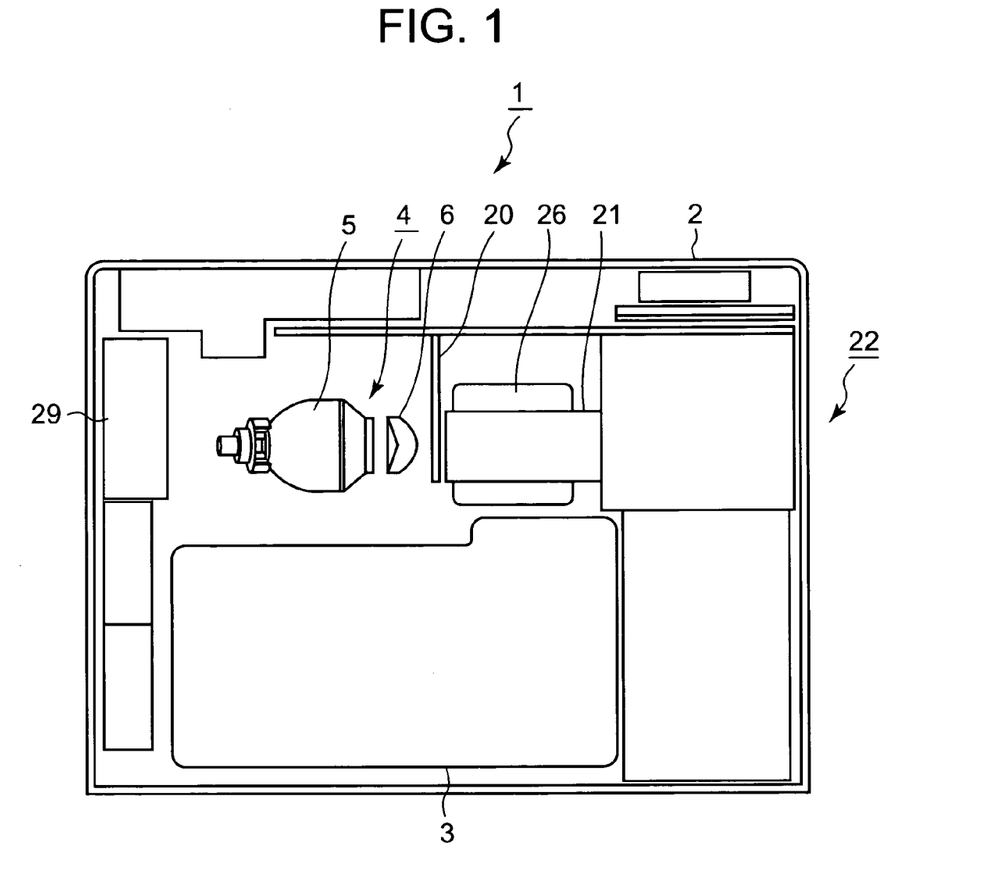
FIG. 1 is a top view of the inner part of a projector apparatus according to an embodiment of the present invention.
Figure 2:
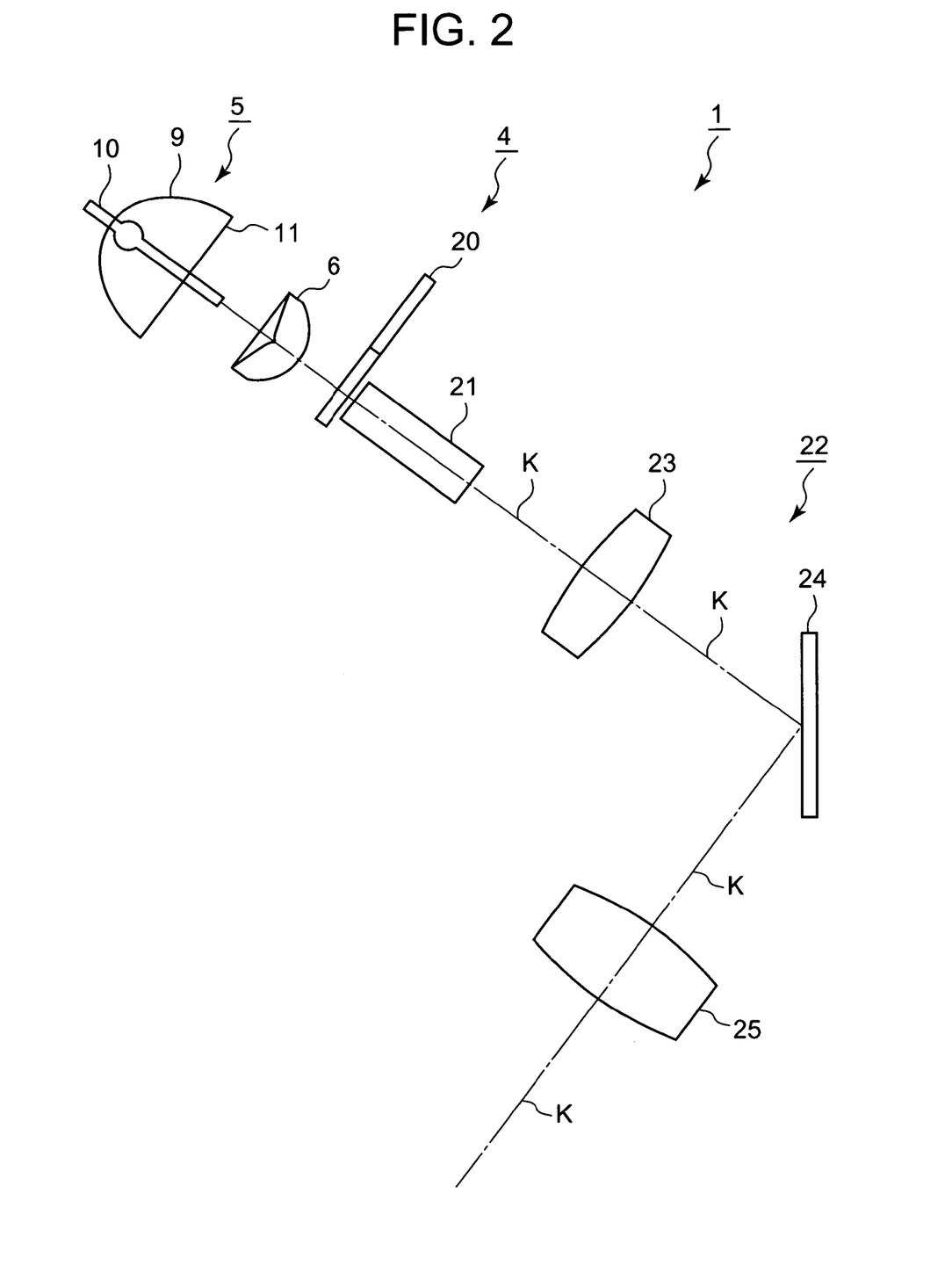
FIG. 2 is a schematic configuration diagram of an optical system according to the projector apparatus of the present embodiment.
Figure 3:
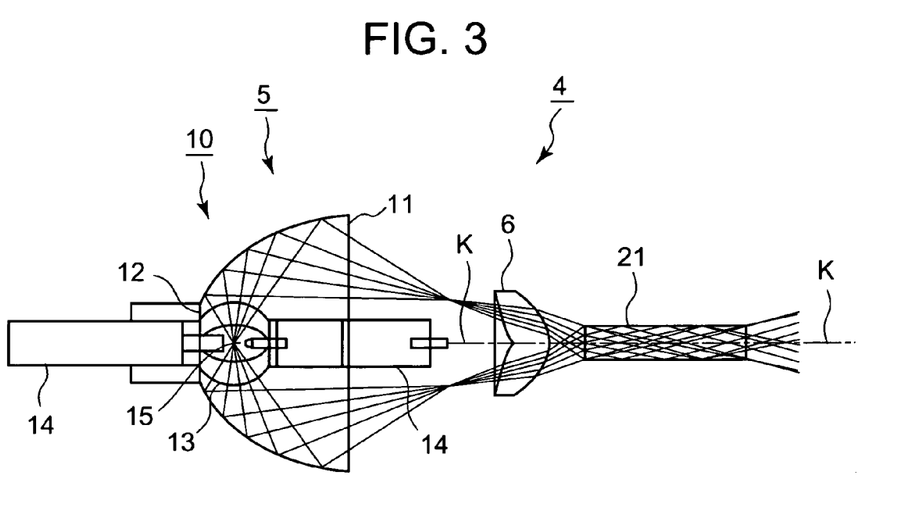
FIG. 3 is a schematic sectional view of a light source unit.

FIG. 1 is a top view showing the inner part of a projector apparatus according to an embodiment of the present invention. FIG. 2 is a schematic configuration diagram of the optical system according to the projector apparatus of the present embodiment. FIG. 3 is a schematic sectional view of a light source unit. In addition, the illustration of a color wheel 20 is omitted in FIG. 3.

As shown in FIG. 1, a projector apparatus 1 is provided with a case 2. A power source substrate 3 for controlling the whole body of the projector apparatus 1 is disposed in the inner part of the case 2. On the power source substrate 3 a not shown power source is attached. Near the central portion in the case 2, a light source unit 4 controlled by the power source substrate 3 is disposed.

As shown in FIGS. 2 and 3, the light source unit 4 is composed of a light source 5 and a condenser lens 6. As shown in FIG. 3, the light source 5 is composed of a reflector 9 and a lamp 10 housed in the reflector 9.

The reflector 9 is formed into a polynomial surface shape. The polynomial surface shape of the reflector 9 is a form expressed by the formula obtained by substituting a value shown in Table 1 for each parameter of the following Formula (1).

TABLE 1

$$z = \frac{cr^2}{1 + \sqrt{1 - (1+k)c^2 r^2}} + c1\,r + c2\,r^2 + c3\,r^3 + c4\,r^4 \cdots c10\,r^{10} \quad (1)$$

| | |
|---|---|
| DIAMETER OF OPENING FOR RADIATING LIGHT (mm) | 33.12 |
| DIAMETER OF OPENING FOR HOUSING LAMP (mm) | 11 |
| CONIC CONSTANT: k | −0.47973 |
| CURVATURE: c | 0.0837149 |
| COEFFICIENT: c1 | 9.29227E−02 |
| COEFFICIENT: c2 | −3.764339E−02 |
| COEFFICIENT: c3 | 7.347004E−03 |
| COEFFICIENT: c4 | −5.758458E−04 |
| COEFFICIENT: c5 | −1.368030E−06 |
| COEFFICIENT: c6 | 2.231387E−06 |
| COEFFICIENT: c7 | −2.921644E−08 |
| COEFFICIENT: c8 | −1.982415E−09 |
| COEFFICIENT: c9 | −2.136231E−10 |
| COEFFICIENT: c10 | 1.042357E−11 |

In Formula (1), the letter z denotes an axis in an optical axis direction (the traveling direction of light is supposed to be positive); the letter c denotes a radius of curvature; the letter k denotes a conic constant; and the letter r (mm) denotes the length of a perpendicular line when the perpendicular line is let fall from the edge portion of an opening for radiating light 11, which will be described later, to the optical axis K.

Moreover, the opening for radiating light 11 is formed on the reflector 9 for making light outgo. Furthermore, an opening for housing a lamp 12 is also formed at the base of the reflector 9, and the lamp 10 is housed from the opening for housing a lamp 12.

Figure 4A:
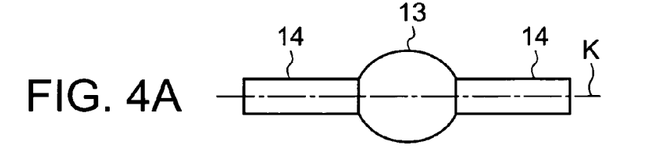
FIGS. 4A, 4B and 4C are schematic views showing a lamp used for the present invention.

As shown in FIG. 4A, the lamp 10 is composed of a bulb 13 making light outgo and electrode introducing units 14 provided on both the ends of the bulb 13 in the longitudinal direction thereof for introducing electrodes into the bulb 13. Moreover, in the bulb 13, an arc 15 carrying out discharges is provided. The bulb 13 is disposed near the opening for housing a lamp 12 in the reflector 9 so that the focus position of emitted light emitted from the bulb 13 to be reflected by the inner wall of the reflector 9 may be formed at a position farther than the electrode introducing unit 14 on the side of the traveling direction of the emitted light.

As a concrete shape of the bulb 13 used for the present invention, for example, the following shape can be cited.

Figure 4B:
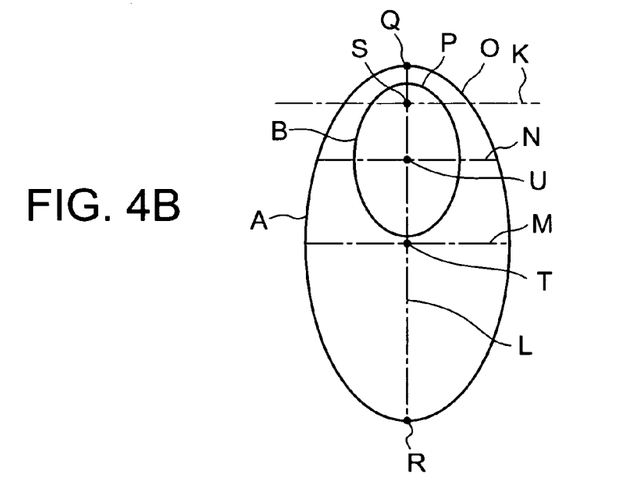

First, as shown in FIG. 4B, an ellipse A having a conic coefficient of −0.91508, the radius of curvature of 4.175964 mm, a semimajor axis of 49.17239 mm and a semiminor axis of 14.32976 mm is located so that the major axis L of the ellipse A may cross at right angles with the optical axis K. At this time, the optical axis K is disposed so that the optical axis K may cross at right angles with the major axis L of the ellipse A at a position distant by 5.25 mm from a point Q at one end on the major axis L of the ellipse A to the side of a point R at the other end on the major axis L of the ellipse A (hereinafter, the point where the optical axis K crosses at right angles with the major axis L of the ellipse A is referred to as a "point S").

Next, an ellipse B is disposed so that the central point U of the ellipse B may be located at a position distant by 24.77409 mm from the central point T of the ellipse A on the side of the point Q on the major axis L and so that the minor axis N of the ellipse B may be parallel to the minor axis M of the ellipse A. The ellipse B has a conic coefficient of −0.85721, the radius of curvature of 110047 mm, a semimajor axis of 21.7811 mm and a semiminor axis of 8.230445 mm.

Figure 4C:
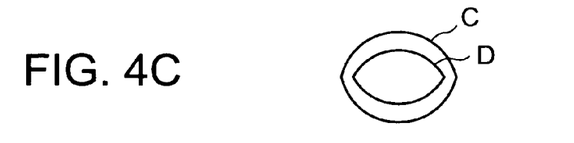

Next, the ellipses A and B are rotated around the optical axis K. Thereupon, a solid spindle C shown in FIG. 4C is formed by an arc O of the ellipse A, which is located nearer to the point Q than the optical axis K and rotates around the optical axis K.

The outer edge portion of the solid spindle C corresponds to the periphery of the bulb used for the present embodiment. Moreover, the space in the inside of a spindle D formed by the rotation of an arc P of the ellipse B, which is located nearer to the point Q than the optical axis K, around the optical axis K corresponds to the space in which the arc 15 is housed in the bulb.

Then, the shape of the space between the spindles C and D corresponds to the shape of a glass member for housing the arc, and the point S corresponds to the position of the arc housed in the bulb. By attaching the electrode introducing units 14 supplying electric power to the arc on both the ends of the bulb 13, which has the shape mentioned above, in the longitudinal direction of the bulb 13 as shown in FIG. 4A, the lamp 10 used for the present invention is formed.

The condenser lens 6 is disposed in the traveling direction of the light that has outgone from the opening for radiating light 11 of the reflector 9. The shape of the condenser lens 6 is not limited as long as the condenser lens 6 can sufficiently condense the light that has outgone from the opening for radiating light 11 to make the condensed light outgo into the traveling direction of the light. An example of a lens capable of being used as the condenser lens is shown in the following.

Figure 5:
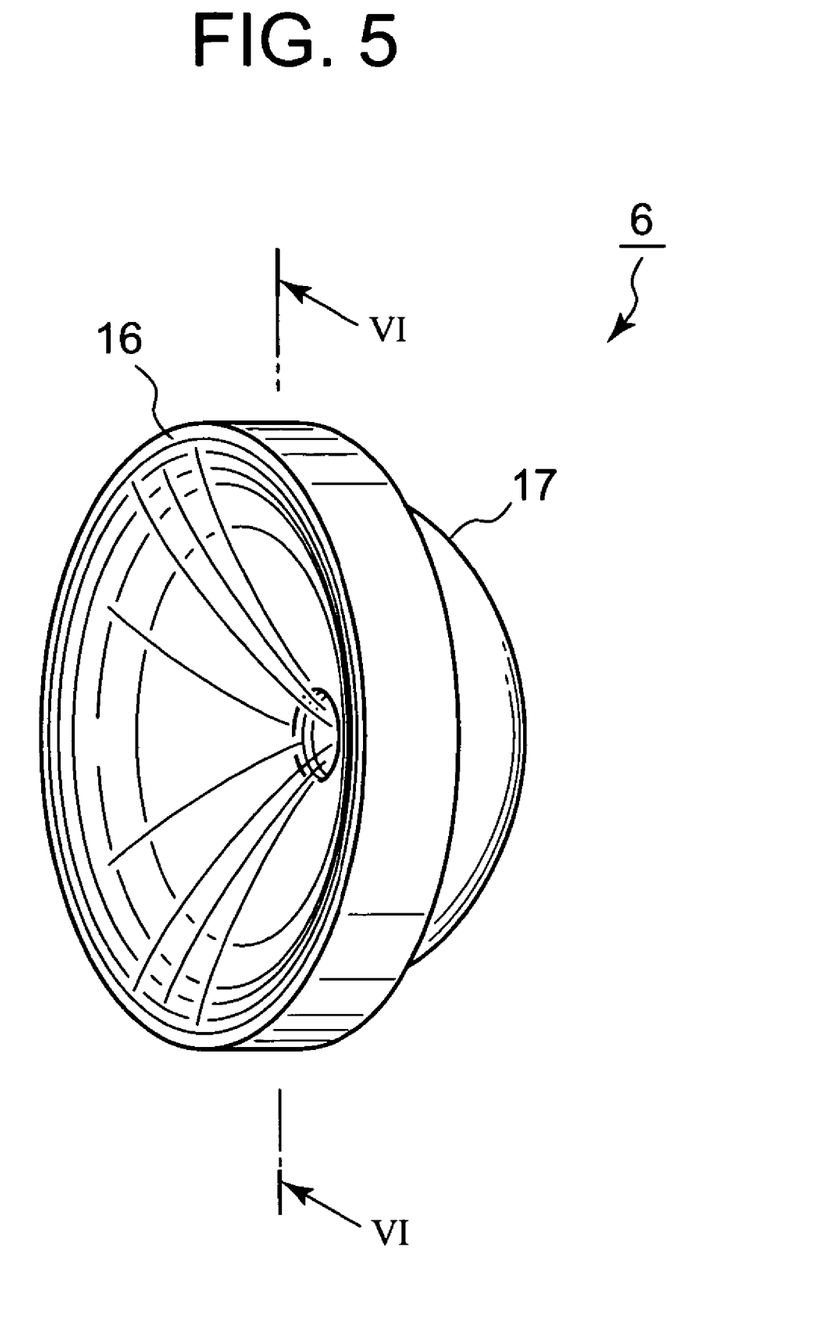
FIG. 5 is a schematic perspective view of a condenser lens according to the present embodiment.
Figure 6:
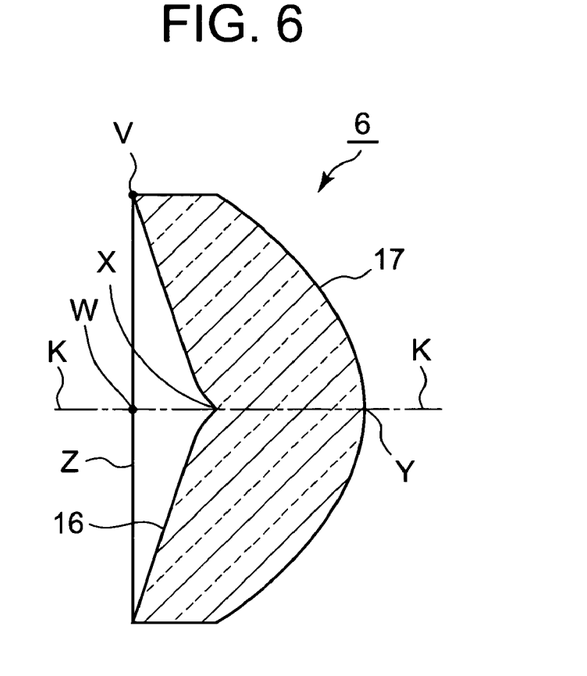
FIG. 6 is a sectional view taken along a line VI-VI of the condenser lens shown in FIG. 5.

FIG. 5 is a schematic perspective view of an example of the condenser lens 6, and FIG. 6 is a sectional view taken along the line VI-VI of the condenser lens 6 shown in FIG. 5.

As shown in FIGS. 5 and 6, a lens surface 16 on the side on which the light that has outgone from the opening for radiating light 11 of the reflector 9 is radiated is formed into a concave, and the lens surface 16 is formed to be most depressed in the central portion of the lens surface 16. Moreover, a lens surface 17 on the side from which the light of the condenser lens 6 outgoes is formed into a convex, and is formed so that the central portion of the lens surface 17 may evaginate. In addition, although the central portion of the lens surface 16 of the condenser lens 6 is formed so as to be depressed and the central portion of the lens surface 17 of the condenser lens 6 is formed so as to evaginate, the lens surface 16 may be simply formed into a concave and the lens surface 17 may be also simply formed into a convex.

The condenser lens 6 is disposed so that the lens surface 16 may be opposed to the opening for radiating light 11 of the reflector 9 of the light source 5 and the lens surface 17 may be opposed to the incidence surface 21a of a mirror tunnel 21, which will be described later. Moreover, the condenser lens 6 is disposed so that the center of the lens surface 16 and the center of the lens surface 17 may be located on the optical axis K.

The shape of the lens surface 16 on the side of the light source 5 of the condenser lens 6 and the shape of the lens surface 17 on the side of the mirror tunnel 21 are expressed by the formulae obtained by substituting each parameter of the following Formula (2) for a value shown in Table 2.

TABLE 2

$$z = \frac{cr^2}{1 + \sqrt{1 - (1+k)c^2r^2}} + c_1 r + c_2 r^2 + c_3 r^3 + c_4 r^4 \quad (2)$$

|  | LENS SURFACE 16 | LENS SURFACE 17 |
|---|---|---|
| CONIC CONSTANT: k | −1 | −1 |
| RADIUS OF CURVATURE: c | INFINITY | INFINITY |
| COEFFICIENT: c1 | −8.124720E−01 | 1.535353E−01 |
| COEFFICIENT: c2 | 1.777498E−01 | −8.654634E−02 |
| COEFFICIENT: c3 | −2.406356E−02 | −1.362107E−03 |
| COEFFICIENT: c4 | 1.099373E−03 | 2.023045E−04 |

In Formula (2), the letter z denotes an axis in an optical axis direction (the traveling direction of light is supposed to be positive); the letter c denotes a radius of curvature; and the letter k denotes a conic constant. Moreover, the letter r (mm) denotes the length of a perpendicular line Z when the perpendicular line Z is let fall from a point V, which is a point on the edge portion of the condenser lens 6, to the optical axis K, as shown in FIG. 6.

Figure 7:
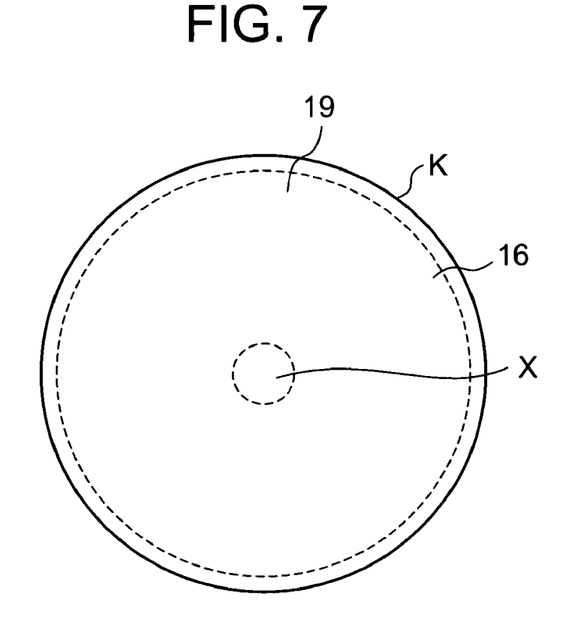
FIG. 7 is a schematic front view of the lens surface on the light source side of the condenser lens according to the present embodiment.

The lens surface 16 on the side of the light source 5 of the condenser lens 6 can be divided into the range (hereinafter referred to as an "effective range") that condenses radiated light to introduce the condensed light to the lens surface 17 on the side of the mirror tunnel 21 and the other range. For example, in case of a condenser lens having the radius of 10 mm, as shown in FIG. 7, the effective range 19 is the range on the outside of the range within 1.5 mm from the central point X and on the inside of the range within 9 mm from the central point X. Then, the distance from a point W to the central point X is 3.4 mm, and the distance from the central point X to a point Y, where the optical axis K and the lens surface 17 are crossed with each other, is 6.51 mm.

As shown in FIGS. 1 and 2, in the outgoing direction of light of the condenser lens 6, the color wheel 20, which converts the light that has outgone from the condenser lens 6 into each color of red (R), green (G) and blue (B), is disposed. The mirror tunnel 21 is disposed in the traveling direction of the light that has been transmitted through the color wheel 20, and an image unit 22 for projecting an image on a screen is disposed in the outgoing direction of light of the mirror tunnel 21. In addition, the color wheel 20 may be disposed on the side of the outgoing direction of light of the mirror tunnel 21.

The color wheel 20 is a circular rotation plate, and is equipped with the color filters of a red (R) one, a green (G) one and a blue (B) one, which are arranged in the circumferential direction. The color wheel 20 is disposed so that the central axis of rotation is laterally shifted from the optical axis K.

The mirror tunnel 21 is a transparent rectangular column, and is provided to be arranged along the optical axis K. The mirror tunnel 21 introduces the incidence light from the incidence surface 21a into the optical axis direction, making the incidence light carry out the total reflections thereof at the interface between the side surface of the mirror tunnel 21 and the outside air layer. Then, the mirror tunnel 21 makes the guided light outgo from the exit surface 21b of the mirror tunnel 21 as a light flux having a uniform intensity distribution. In addition, a rectangular cylinder in which a reflection film is provided on the whole inner circumferential surface thereof may be used as the mirror tunnel 21.

As shown in FIGS. 1 and 2, the image unit 22 is disposed in the direction in which light is made to outgo from the mirror tunnel 21. As shown in FIG. 2, the image unit 22 is composed of, for example, a lens 23 irradiated by the light that has been made to outgo from the mirror tunnel 21, a micro-mirror device 24 irradiated by the light that has been made to outgo from the lens 23, and a projector lens 25 on which the light that has been reflected by the micro-mirror device 24 is projected.

The lens 23 projects the light that has been made to outgo from the mirror tunnel 21 on the micro-mirror device 24. Although the lens 23 is illustrated as a single lens in FIG. 2, the lens 23 may be composed of a plurality of lenses.

The micro-mirror device 24 forms each pixel of a display image by a plurality of micro-mirrors, and switches the light and darkness of the pixels by switching the inclination directions of these micro-mirrors to project the image. The micro-mirrors are formed of ultra-thin pieces of metal such as the pieces of aluminum, and each of the micro-mirrors has a vertical width and a horizontal width, each within a range of from 10 µm to 20 µm. Each of these micro-mirrors is formed on each of a plurality of mirror driving devices (not shown) such as CMOS's arranged in a matrix in row directions and column directions.

The projector lens 25 expands the reflected light from the micro-mirror device 24 to project the expanded light onto the screen (not shown). In addition, although the projector lens 25 is illustrated as a single lens in FIG. 2, the projector lens 25 may be composed of a plurality of lenses.

As shown in FIG. 1, a sirocco fan 26 making cooling air flow into the inside of the light source 5 in order to cool the light source 5 is disposed between the case 2 and the mirror tunnel 21. Moreover, an axial flow fan 29 for exhausting the air that has been made to flow into the light source 5 is disposed in the direction of the opening for housing a lamp 12 of the reflector 9.

Figure 8:
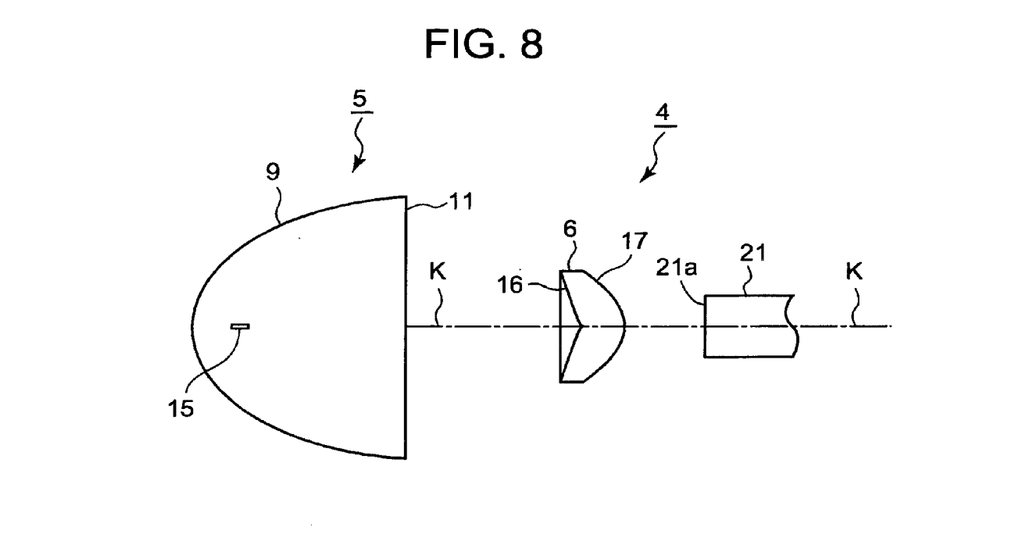
FIG. 8 is a schematic view showing a positional relation between the members constituting the light source unit.

Here, an example of the positional relation of the light source unit 4 used in the present embodiment is described. In addition, the above exemplified sizes of the reflector, the lamp and the condenser lens are used as those in the description here. FIG. 8 is a schematic sectional view of the light source unit 4 showing the positional relation of the members constituting the light source unit 4. In addition, in order to clarify the positional relation, the illustration of the color wheel 20 is omitted in FIG. 8.

The arc 15 is disposed so as to be located at a position distant from the base of the reflector 9 by 5.794 mm on the optical axis K. The condenser lens 6 is disposed so that the center of the lens surface 16 on the side of the light source 5 may be located at a position distant from the arc 15 by 33.34 mm. Moreover, the mirror tunnel 21 is disposed so that the distance from the arc 15 to the point where the incidence surface 21a and the optical axis K cross at right angles may be 47.5 mm.

Next, the operation of the embodiment of the present invention is described.

When the projector apparatus 1 is driven, light is emitted from the bulb 13 of the light source 5, and most of the emitted light is radiated onto the inner wall of the reflector 9, on which mirror surface working is performed.

At this time, as shown in FIG. 3, the bulb 13 of the light source 5 is disposed near to the opening for housing a lamp 12 in the reflector 9 so that the focus position of emitted light that has been emitted from the bulb 13 and has been reflected by the inner wall of the reflector 9 may be formed at a position farther than the end of the electrode introducing unit 14 on the side of the condenser lens 6 in the traveling direction of the reflected light. Consequently, most of the reflected light is radiated to the portions other than the central portion of the lens surface 16 of the condenser lens 6. The light radiated into the effective range 19 in the light radiated onto the lens surface 16 of the condenser lens 6 is condensed before being radiated from the lens surface 17 into the color wheel 20.

After the light that has been radiated into the color wheel 20 is converted into three colors of red, green and blue by the filter of each color of the red (R), the green (G) and the blue (B), respectively, the converted light is radiated onto the incidence surface 21a of the mirror tunnel 21. The light that has been incident into the mirror tunnel 21 is guided into the optical axis direction, being subjected to the total reflection at the interface between the side surface in the mirror tunnel 21 and the outside air layer as shown in FIG. 3. Then, the guided light is radiated into the lens 23 after having been made to outgo from the exit surface 21b.

The light flux of the light that has been radiated on the lens 23 is expanded by the lens 23, and then the expanded light is radiated onto the micro-device 24. Then, the light reflected by the micro-mirror device 24 is expanded by the projector lens 25 to be projected onto the not shown screen.

As described above, according to the present invention, because the focus position of the emitted light that has been emitted from the bulb 13 and has been reflected by the reflector 9 does not exist on the electrode introducing unit 14, most of the emitted light does not strike the electrode introducing unit 14 of the lamp. Consequently, the emitted light does not attenuate to be radiated onto the lens. Thus, the loss of the emitted light can be reduced, and then the utilization efficiency of the emitted light emitted from the light source 5 can be improved. Consequently, it becomes possible to miniaturize the reflector 9, and to miniaturize the whole body of the light source unit 4 in comparison with the conventional light source unit.

Moreover, because the light source unit 4 is miniaturized, the projector apparatus 1, which installs the miniaturized light source unit 4, can be miniaturized itself.

What is claimed is:

1. A light source unit, comprising:
  a reflector having an opening for housing a lamp and an opening for radiating light, the reflector having an inner surface subjected to mirror surface working to be shaped in a polynomial surface;
  a light source having an electrode therein, the light source comprising a bulb for emitting light and an electrode introducing unit for guiding the electrode to the bulb, the light source being inserted into the reflector from the opening for housing the lamp; and
  a condenser lens for condensing the light emitted from the reflector, the condenser lens being disposed so as to be located on an optical axis of light emitted from the light source;
  wherein the bulb is disposed so that focus positions of the emitted light reflected by an inner wall of the reflector are not located on the electrode introducing unit, are not located on the condenser lens, and are located between the opening for radiating light from the reflector and a radiated light receiving surface of the condenser lens, the focus positions of the emitted light being on a circle around the optical axis with the optical axis as a center of the circle.

2. The light source unit as claimed in claim 1, wherein a lens surface on a first side of the condenser lens is concave, and a lens surface on a second side of the condenser lens is convex.

3. The light source unit as claimed in claim 2, wherein a central portion of the lens surface on the first side of the condenser lens is depressed, and a central portion of the lens surface on the second side of the condenser lens is evaginated.

4. A projector apparatus comprising:
  (i) a light source unit including:
    a reflector having an opening for housing a lamp and an opening for radiating light, the reflector having an inner surface subjected to mirror surface working to be shaped in a polynomial surface;
    a light source having an electrode therein, the light source comprising a bulb for emitting light and an electrode introducing unit for guiding the electrode to the bulb, the light source being inserted into the reflector from the opening for housing the lamp; and
    a condenser lens for condensing the light emitted from the reflector, the condenser lens being disposed so as to be located on an optical axis of light emitted from the light source;
    wherein the bulb is disposed so that focus positions of the emitted light reflected by an inner wall of the reflector are not located on the electrode introducing unit, are not located on the condenser lens, and are located between the opening for radiating light from the reflector and a radiated light receiving surface of the condenser lens, the focus positions of the emitted light being on a circle around the optical axis with the optical axis as a center of the circle;
  (ii) a mirror tunnel for guiding light that has come out from the condenser lens;
  (iii) a lens for condensing light that has come out from the mirror tunnel;
  (iv) a micro-mirror device for receiving light that has come out from the lens to project an image; and
  (v) a projector lens for expanding the image projected from the micro-mirror device.

5. The projector apparatus as claimed in claim 4, wherein a lens surface on a first side of the condenser lens is concave, and a lens surface on a second side of the condenser lens is convex.

6. The projector apparatus as claimed in claim 5, wherein a central portion of the lens surface on the first side of the condenser lens is depressed, and a central portion of the lens surface on the second side of the condenser lens is evaginated.

* * * * *